A. ELLIS.
CUSHION WHEEL.
APPLICATION FILED FEB. 24, 1908.

938,834.

Patented Nov. 2, 1909.

WITNESSES
Chas. K. Davis
Ella L. Corbett

INVENTOR
Abram Ellis
by Brock, Bieken & Smith
Attorney

UNITED STATES PATENT OFFICE.

ABRAM ELLIS, OF AUGUSTA, GEORGIA.

CUSHION-WHEEL.

938,834.  Specification of Letters Patent.  Patented Nov. 2, 1909.

Application filed February 24, 1908. Serial No. 417,350.

*To all whom it may concern:*

Be it known that I, ABRAM ELLIS, a citizen of the United States, residing at Augusta, in the county of Richmond and State of Georgia, have invented certain new and useful Improvements in Cushion-Wheels, of which the following is a specification.

My invention relates to cushion wheels or vehicles.

One of the objects of the invention is to simplify the structure and eliminate fastening devices such as nuts and bolts so far as possible. I employ separate tread segments which have an independent movement within a wide range and my invention provides simplified and improved means for supporting and directing the movement of these segments.

The invention is particularly described with reference to the accompanying drawing, in which—

Figure 1:
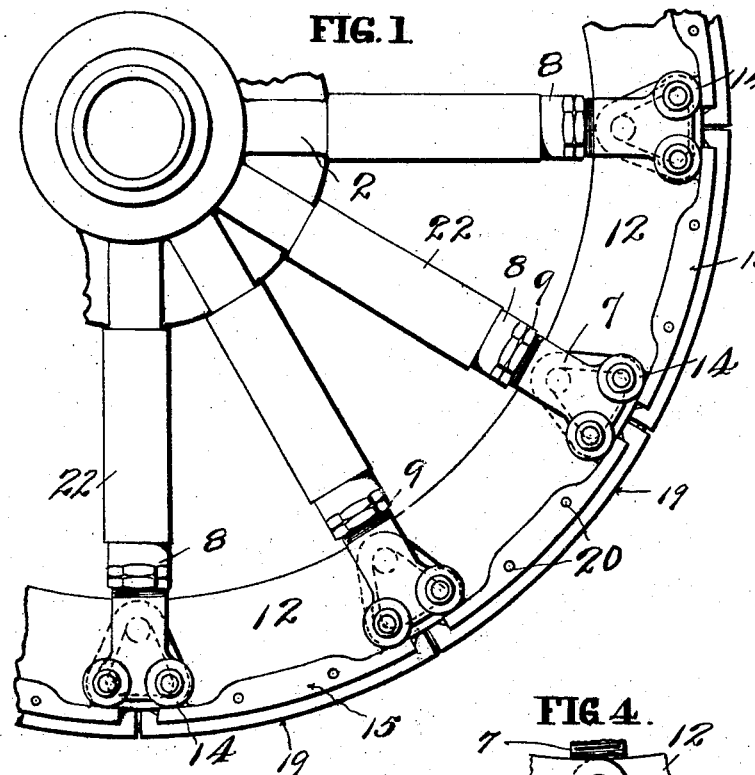
Figure 4:
Figure 3:
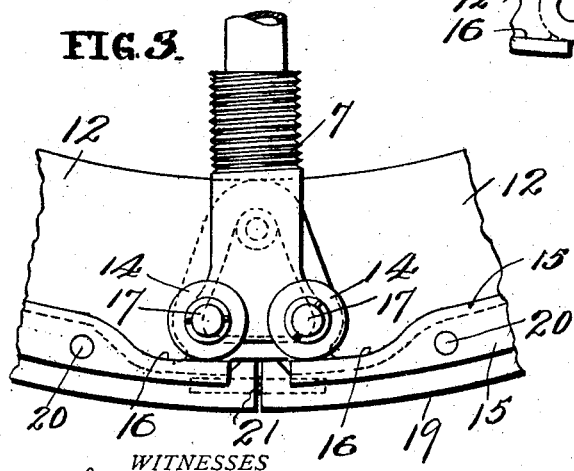
Figure 2:
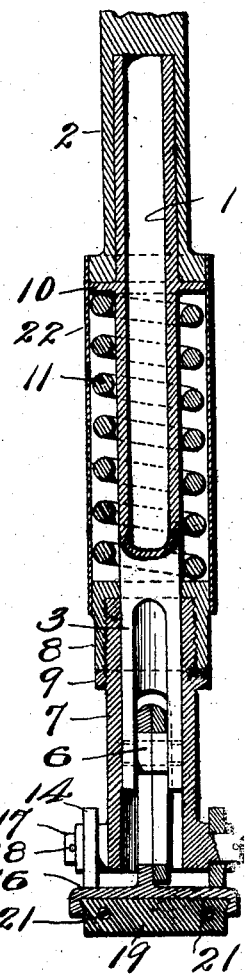

Figure 1 is an elevation of a section of a wheel, Fig. 2 is a section through one of the spokes and tread in a plane containing the axis of the wheel, Fig. 3 is a fragmentary view of a portion of the wheel showing the ends of two adjoining tread segments and adjacent parts, and Fig. 4 is a detail view similar to Fig. 3, but with a portion of the spring fork 7 cut away showing the slots in the tread segments.

The spokes 1, which are usually hollow, are forced, brazed, pinned, or otherwise secured in sockets in the hub 2. Each spoke is slotted at the end forming a rigid fork 3. Near the end each fork 3 carries rollers 6 rotatably mounted on a stud. Another fork 7, which for identification I term a spring fork, is mounted on each rigid spoke and fork 1 so that it may reciprocate. Each spring fork carries a spring seat 8 consisting of a nut screwed on the fork sleeve for the purposes of adjustment. Lock nuts 9 serve to secure spring seats 8 in adjusted position. Spokes 1 are provided with flanges 10 which constitute stationary spring seats and a spring 11 is mounted on each spoke between the fixed seat 10 and movable seat 8. Spring forks 7 carry the weight of the wheel upon the tread segments and the springs cushion the movement of the forks. The fixed spring seat 10 is arranged on the spoke to avoid loosening the spoke in its socket by reason of the spring reaction which might occur if the fixed abutment for the spring were a member of the hub.

The tread consists of separate segments 12 having overlapping ends provided with registering flared slots 13. The overlapping segment ends rest within the slots of forks 3 and 7, and rolls 6 lie within the slots, each roll normally engaging the top of the slot 13 of one of the segments. The arms of forks 7 each carries two rolls 14. The tread segments are provided with housings 15, the upper surfaces of which are shaped at each end to form tracks 16, and one of the rolls 14 runs on each of these tracks.

It is evident that the weight of the vehicle imposed on the hub is communicated to springs 11 and by them to the spring forks 7 and thence through rolls 14 to the tread segments. The springs also normally urge the tread segments outward until stopped by contact of the inner ends of their slots 13 with rollers 6. On encountering an inequality in the road surface any segment may move toward the wheel center against the resistance of its spring or springs. The movement of the segments varies greatly, dependent on the point at which an obstruction is encountered. The shape of slots 13 permits this varying movement in a satisfactory manner. As either end of the segment moves it changes position with relation to the adjacent spring fork and this varying movement is guided and controlled by the corresponding rolls 14 which run on the tracks 16.

In order to avoid objectionable fastening devices rolls 14 are preferably mounted on studs 17 integral with the ends of forks 7. A washer is placed outside of each roll and a cotter pin 18 passes through the stud outside the washer, serving to hold the rolls in position and at the same time to permit ready removal.

Housings 15 are usually arranged to accommodate rubber treads 19 which may be secured in any suitable way, for instance by pins 20 passing through the enlarged portions of the housings. The adjoining ends of the rubber tread sections may be arranged to nearly meet and are preferably connected by pins 21. These pins serve to preserve a more or less continuous tread surface even when the adjoining ends of two segments move considerably in relation to each other and also serve to more or less damp the action of the springs.

The springs may be protected by sleeves 22 secured to the hub and forming a sliding fit upon the spring seats 8.

I claim:

1. The combination of a hub, rigid spokes thereon, tread segments provided with registering flared slots engaging members of said spokes, sleeves movably mounted on the spokes and engaging the tread segments near their outer faces and springs intermediate the hub and the sleeves.

2. The combination of a hub, rigid spokes thereon, said spokes being forked at their outer ends, a transverse member in the end of each fork, independent tread segments having registering flared slots inclosing said transverse members, sleeves movably mounted on the spokes and forked at their outer ends, rollers carried by the sleeves and engaging the tread segments at a considerable distance outwardly from said transverse members and springs intermediate the sleeves and the hub.

3. The combination of a hub, rigid forked spokes therein, independently movable tread segments each comprising a web and a tread, the adjacent ends of the webs of each pair of segments being overlapped and provided with registering outwardly flaring slots, said overlying ends being arranged in the forks of the spokes, guide-rollers carried by the forks within the slots and normally engaging the tops thereof, sleeves movably mounted on the forks and provided with rollers engaging the said treads of the segments and springs intermediate the hub and the sleeves.

4. The combination of a hub, forked spokes rigidly mounted therein, tread segments comprising webs having their ends overlapped within the forks and provided with registering flared slots and tread segments, rollers carried by the forks and normally engaging the tops of said slots, sleeves mounted for reciprocation on the spokes, and forked to accommodate the webs of the tread segments, each side of the fork of each sleeve carrying two rollers, said rollers engaging suitably shaped tracks provided upon the inner faces of the treads.

ABRAM ELLIS.

Witnesses:
 GEO. W. EVANS,
 A. D. TOBIN.